United States Patent [19]

Deets

[11] 3,903,037

[45] Sept. 2, 1975

[54] LOW MELT VISCOSITY SELF-EXTINGUISHING POLYMERIC POLYBLEND

[75] Inventor: Gary L. Deets, Springfield, Mass.

[73] Assignee: Monsanto Company, St. Louis, Mo.

[22] Filed: Aug. 31, 1972

[21] Appl. No.: 285,487

[52] U.S. Cl....... 260/32.6 A; 260/876; 260/DIG. 24
[51] Int. Cl.² ......................................... C08L 51/04
[58] Field of Search......... 260/32.6 A, 876, DIG. 24

[56] References Cited
UNITED STATES PATENTS

| | | | |
|---|---|---|---|
| 2,325,947 | 8/1943 | Garvey | 260/32.6 A |
| 2,413,163 | 12/1946 | Bacon | 260/DIG. 24 |
| 2,717,216 | 9/1955 | Arone | 260/DIG. 24 |
| 2,884,392 | 4/1959 | Clark et al. | 260/32.6 A |
| 3,509,237 | 4/1970 | Aubrey | 260/876 |
| 3,671,607 | 6/1972 | Lee | 260/876 R |
| 3,676,526 | 7/1972 | Sommerfeld | 260/876 R |
| 3,691,262 | 9/1972 | Hagerman | 260/DIG. 24 |
| 3,700,622 | 10/1972 | Terenzi | 260/876 R |

OTHER PUBLICATIONS

Encyclopedia of Polymer Science and Technology, Vol. 7 (1967) pp. 15 & 20 (TP156.P6E6).

Glyco Product Bulletin; "Synthetic Waxes" pages 4 & 5 (no date given – supplied by applicants).

A. & E. Rose, ed., Condensed Chemical Dictionary (5th ed.), (1956) page 98.

*Primary Examiner*—Donald E. Czaja
*Assistant Examiner*—S. M. Person

[57] ABSTRACT

This invention relates to a low melt viscosity, selfextinguishing polyblend composition comprising a styrene polymer polyblended with a novel grafted chloroprene rubber, an inorganic compound and an alkylene bis-stearamide. More particularly, the novel grafted chloroprene provides the styrene polymer with high impact strength serving also as a source of labile halogen for flame retardancy; the inorganic compound catalyzes the evolution of halogen providing self-extinguishing properties to the polyblend and the alkylene bis-stearamide provides the polyblend with low melt viscosity for improved processability and greater toughness.

17 Claims, No Drawings

3,903,037

LOW MELT VISCOSITY SELF-EXTINGUISHING POLYMERIC POLYBLEND

BACKGROUND OF THE INVENTION

Polymeric materials of the styrene family including polystyrene and its copolymers, impact resistant polystyrene containing dispersed rubber phases as polyblends and more recently impact resistant copolymers and terpolymers of styrene have gained great commercial utility as tough engineering plastics. Such plastics appear as structural parts of appliances, automobiles and housing.

Government codes are requiring that such plastics be flame-retarding and self-extinguishing. The industry has developed many improved grades of such materials, however, with the ever greater need for high performance plastics, most self-extinguishing types have suffered from inadequate physical properties such as toughness and impact strength.

Self-extinguishing plastics have been formulated with various additives which when added in sufficient amounts to produce self-extinguishing properties in the polymer cause the physical properties to be seriously impaired.

Flame-proofing materials such as the halogenated aliphatic and aromatic compounds which are compatible with the styrene polymer family of plastics often act as plasticizers and lower the modulus, reducing the tensile strength. Such materials are thought to decompose and provide a halogen gas-phase that inhibits the gas-phase combustion of the plastic or perhaps the initial pyrolysis mechanism.

Certain inorganic compounds, in particular metal oxide compounds when used in combination with the halogenated organic compound, appear to catalyze their decomposition or enter the chain of reactions to form metal halides that are effective flame retardants. Such systems are not predictable in that many such combinations lower the melt point of the polymer causing it to pyrolyze more readily, hence, actually increasing flammability. Beyond flammability such combinations have caused the polymer systems to degrade during heat processing or on exposure to light.

Polymeric plasticizers containing halogens such as polyvinyl chloride and chlorinated olefins have been tried to overcome the deficiencies of the lower molecular weight halogenated organic compounds. Such polymeric materials, however, as used in the styrene family of plastics have lowered their heat stability during processing and given lower physical properties, particularly lower modulus, heat distortion and impact strength.

The above problems have been overcome in the styrene family of impact polymeric polyblends by the incorporation of a particular novel grafted halogen containing rubber that will provide both self-extinguishing properties and superior physical properties such as impact strength and modulus. It has been further discovered that the novel halogenated rubber when used in combination with certain metal oxides in the polyblends gives even further improvement in self-extinguishing properties.

The addition of grafted chloroprene rubber and inorganic compounds to the polyblend to give self-extinguishing properties, however, seriously decreased the flow of such polyblends causing them to be more difficult to process. It is the objective of the present invention to improve the flow of the self-extinguishing polyblend, yet not seriously lower the important physical and engineering properties such as toughness, heat distortion and fire retardancy. It was discovered that the balance of properties needed could be obtained by incorporating in the polyblend particular alkylene bis-stearamides that improved the melt flow and the impact strength of the polyblend without materially lowering its heat distortion or self-extinguishing properties providing an engineering plastic of great utility.

SUMMARY OF THE INVENTION

The present invention relates to a low melt viscosity, self-extinguishing polyblend composition and more particularly to a composition of matter comprising:

1. a low melt viscosity self-extinguishing high impact strength polymeric polyblend composition comprising:
    A. a polymer of at least one monovinylidene aromatic monomer and an ethylenically unsaturated nitrile monomer wherein said ethyleneically unsaturated nitrile monomer moiety constitutes from 0 to about 90 per cent by weight of said polymer uniformly blended with,
    B. a grafted chloroprene rubber, said rubber grafted with:
        1. at least one monovinylidene organic monomer and,
        2. an ethylenically unsaturated nitrile monomer wherein said ethylenically unsaturated nitrile monomer moiety constitutes from 0 to about 90 per cent by weight of the total monomers grafted and,
    C. an inorganic compound selected from the group consisting of of $Sb_2O_3$, $Bi_2O_3$, $MoO_3$, $SnO$, $WO_3$, $Fe_2O_3$, and mixtures of the same, and
    D. an alkylene bis-stearamide.

The present invention also relates to a method for producing self-extinguishing high impact polyblends of the styrene family by blending uniformly a mixture of a styrene polymer with a grafted chloroprene rubber, a metal oxide and an alkylene bis-stearamide.

DESCRIPTION OF THE PREFERRED EMBODIMENTS

As employed herein, the term polyblend means a mechanical mixture of incompatible polymers wherein the mixing is carried out in the melt phase with the smaller volume polymer phase being dispersed uniformly in the larger volume polymer phase in the melt and cooled state.

In the present invention, the grafted chloroprene rubber phase is dispersed or polyblended into the larger polystyrene or polystyrene copolymer phase by the conventional melt working of a mechanical mixture of the two. The metal oxides and stearamide are also incorporated in this same mixture and dispersed in the larger volume polymer phase by melt working. Melt working and mixing is conventionally carried out, by those skilled in the art, through extrusion, milling or banburying, for example, wherein the styrene polymer phase reaches a melt temperature of 400° to 450°F. Other additives may be present in the melt, e.g. antioxidants, lubricants and pigments.

Such polystyrene polyblends have the rigidity and modulus of the larger outer polystyrene or polystyrene copolymer phase. The inner grafted chloroprene rubber phase exists as small rubber particles that provides the polyblend with much higher impact strength than the rigid other polymeric phase can provide as a single phase. Such rubber particles are considered to be stress releiving centers that give the polyblend high impact strength, greater elongation at fail under stress and greater toughness without serious loss of modulus or rigidity in the outer phase.

The grafted chloroprene rubber is a product of polymerization wherein at least one monovinylidene aromatic monomer and/or ethylenically unsaturated nitrile monomers are polymerized in the presence of chloroprene rubber. The polymerization reaction causes the monomers to polymerize as polymer and as copolymer chains attached to the rubber molecule forming a grafted polychloroprene rubber.

The monovinylidene aromatic monomers used in the polymers making up the polyblends of this invention include styrene, aralkylstyrenes. e.g. o-, m-, and p-methylstyrenes, -ethylstyrenes, -isopropylstyrenes, -butylstyrenes, -tertiary butylstyrenes, various alphaalkylstyrenes, e.g. methylstyrenes, ethylstyrenes, various arhalostyrenes, e.g., o-, m-, and p-chlorostyrenes, bromostyrenes, fluorostyrene; various di, tri, tetra and penta substituted chlorostyrenes, bromostyrenes and fluorostyrenes and various alpha- and beta-halosubstituted styrenes, e.g. alphachlorostyrenes, alphabromostyrenes, beta-chlorostyrenes, beta-bromostyrenes, and alpha, beta-halosubstituted and the like.

The ethylenically unsaturated nitrile monomers used in the polymers of this invention are e.g., acrylonitrile, methacrylonitrile, ethacrylonitrile, methyl methyacrylonitrile and the like with acrylonitrile and methacrylonitrile and the like being preferred.

Either of the vinylidene aromatic monomer or the ethylenically unsaturated nitrile monomer can be used in major proportions relative to one another in copolymerization or grafting. For example, styrene and acrylonitrile will copolymerize wth the preferred ratio of styrene to acrylonitrile (S/AN) being about 75 per cent S to 25 per cent AN or the azeotropic mixture of the two which gives a uniform copolymer. These ratios can be varied from 95/1 to 1/95, S/AN, with certain polymerization methods to give polymers that have great utility.

In applications that need properties such as gas impermeability, light stability, toughness, etc., it is preferred to have the nitrile monomer present in greater proportions, e.g, up to 90 weight percent. For other applications where the fabricated part needs greater plasticity, composition containing a major portion of the monovinylidene aromatic monomer is preferred, e.g. up to 90 weight per cent. The monovinyl aromatic monomer may be halogensubstituted providing a halogen source for flame retarding and can be used in major proportions in the present invention, e.g. 20 to 80 weight per cent.

The rubber component of the polyblend may be polychloroprene or copolymers of chloroprene and other monomers, e.g. butadiene, acrylonitrile, methacrylonitrile, styrene, arhalostyrene, alphahalostyrenes, aralkylstyrenes, alpha-alkylstyrenes, vinyl chloride; or mixtures of polychloroprene and other synthetic or natural rubbers, e.g. polybutadiene, butadiene-styrene copolymer, isoprene, nitrile rubbers, acrylate rubber, butadiene-styrene-acrylonitrile terpolymers, chloroprenebutadiene-styrene terpolymers, chloroprene-butadiene-acrylonitrile terpolymers, halogenated rubbers and the like.

Chloroprene rubbers are commercially available as Neoprene from E.I. du Pont de Nemours and Company as solid rubbers or rubbers contained in emulsions. The generally preferred solid rubbers are the Neoprene W types containing no antioxidant, are colorless, have good heat stability for processing and are soluble or dispersible in the monovinylidene aromatic and ethylenically unsaturated nitrile monomers either in combination or singly. A polymerizing mixture of polychloroprene, styrene and acrylonitrile, etc., wherein the rubber is in solution or dispersed in the reacting monomers will polymerize causing the monomers to graft on to the polychloroprene rubber molecules as grafted chains to form an interpolymer or grafted chloroprene rubber. As the polymerization progresses, a copolymer of styrene and acrylonitrile (SAN) is also formed in the reacting mixture. As the SAN phase becomes larger than the grafted phase, the rubber phase will invert to become the internal phase as a dispersed grafted rubber particle in SAN. Under agitation, this dispersion becomes a uniform dispersion or polyblend of grafted chloroprene rubber in SAN polymer. Such polyblends have much greater impact strength than the rigid SAN phase alone. In the present invention, the grafted chloroprene provides the novel combination of not only improving the impact strength of the larger SAN phase but also causing the SAN polyblend to be flame retardant and self-extinguishing.

The chloroprene rubbers contained in emulsion are readily grafted by dispersing the reacting monomers in the emulsion and grafting such monomers to the rubber much as in the case of the solution polymerization system.

The per cent graft is a controlled amount and can be varied from about 10 to 100 per cent depending on the weight average particle size of the rubber and the properties desired. The per cent graft is defined as the weight per cent of monomers grafted to the rubber particle based on the weight of the rubber, e.g. 100 grams of rubber grafted with 100 grams of monomers has 100 per cent by weight of grafted monomers.

The weight average particle size of the rubber is selected to provide a balance of good physical properties such as impact strength and gloss. In the emulsion polymerization systems, a rubber particle size from about 0.01 to 0.30 microns is preferred with about 0.05 to 0.20 microns being most preferred to give the polyblend desirable impact strength and high gloss. Being small in particle size, they do not lower molded surface gloss. This size rubber particle is grafted in a preferred range of 10 to 100 per cent by weight with 45 to 65 per cent being most preferred to insure compatibility and insure good gloss. A larger weight average rubber particle with a size of from about 0.40 to 1.5 microns beng preferred and from 0.50 to 1.0 microns being most preferred is polyblended with the small rubber particles to further increase the impact strength. The larger rubber particle is grafted in the preferred range of from about 5 per cent to 40 per cent by weight with 10 per cent to 30 per cent being most preferred to insure compatibility and maintain the integrity and particularity of the rubber particle.

Preferably, the polyblend has from about 50 per cent to 97 per cent by weight, most preferred 70 per cent to 90 per cent by weight, of the total weight of the grafted rubber, in the polyblend, in the form of smaller grafted rubber particles and correspondingly and preferably about 3 per cent to 50 per cent by weight, most preferred 10 per cent to 30 per cent, of the larger grafted rubber particles insuring a balance of good gloss and impact strength.

Preferably, the polyblend required from about 15 to 40 per cent by weight of chloroprene rubber based on the total polyblend to insure self-extinguishing properties for the combination. The grafted rubber may be present in the polyblend in a preferred amount of from about 16.5 per cent to 80 per cent by weight, preferably about 16.5 per cent to 70 per cent of the polyblend considering that the graft level can be from about 10 per cent to 100 per cent by weight of the chloroprene rubber. Polyblends using grafted chloroprene can also be prepared having good gloss and impact strength by selecting one optimum sized grafted rubber particle rather than a small and a large rubber particle. This can be accomplished by selecting a rubber particle having a preferred particle size of about 0.3 to 1.5 micron, most preferably about 0.5 to 0.8 micron, and grafting to a higher level preferably from about 10 to 100 per cent, and most preferably, from about 15 per cent to 65 per cent by weight based on rubber.

A further refinement of the polyblend system is used to insure good physical properties such as gloss and impact strength. The degree of graft stabilizes the rubber particle insuring its particulate character so that it stays dispersed in the polyblend and does not agglomerate under the heat and shear of melt colloiding and processing. The chloroprene rubber is preferably chemically crosslinked to further maintain this particulate property. The most preferred chloroprene rubbers used in the emulsion graft systems are crosslinked and contain a medium to high gel content being extremely viscous having a Mooney viscosity above at least about 200 (MS-2-1/2 min. 212°F.). These rubber latices are sold by the du Pont Company as Neoprene Latices, e.g. Neoprene 842A.

It has been further discovered that high impact, self-extinguishing polyblends using grafted chloroprene rubbers can have their physical properties further enhanced by blending in small amounts of grafted polybutadiene rubbers to increase low temperature impact properties. Chloroprene rubbers have a second order transition temperature (Tg by ASTM Test D-746-52T) of about −40°C. and become brittle as this temperature is approached in use. The polyblends lose impact strength as the polyblend reaches this temperature range because the grafted rubber particles of the polyblend become brittle can no longer absorb stress. Polybutadiene rubbers have a lower Tg, in particular, the high cis-type polybutadiene rubbers have a Tg range of from about −50° to −105°C. with a preferred range of from about −75°C. to −95°C. Such rubber are grafted with monovinylidene aromatic monomers (e.g. styrene) and or ethylenically unsaturated nitrile monomers, e.g. acrylonitrile or methacrylonitrile and are functional and compatible with the polyblends of this invention.

It has been discovered that a small amount of grafted crosslinking polybutadiene rubber wherein the rubber is grafted with 50 to 150 per cent by weight of said monomers and provides 0.5 per cent to 5 per cent preferably 1 to 3 per cent by weight of rubber to the total polyblend gives an impact strength of 1.5 to 7.0 ft./lbs. when blended with the grafted polychloroprene polyblend having a highly grafted chloroprene rubber with a small particle size. The grafted polybutadiene rubber particle has a preferred weight average size of from about 0.7 to 1.5 microns and most preferred 0.8 to 1.2 microns, wherein the polychloroprene rubber particle has a preferred weight average size of from about 0.05 to 0.20 microns. Such blends have a high gloss, in the range of 50 to 70 by the Hunter Gloss Meter.

It is necessary to have present in the polyblend at least about 1 per cent by weight of the polyblend of an inorganic compound with the preferred range of about 1 per cent to 15 per cent and the most preferred amount being about 5 per cent to 10 per cent. The inorganic compounds preferred are certain metal oxides, e.g. $Sb_2O_3$, $Bi_2O_3$, $MoO_3$, $SnO_2$, $WO_3$, $Fe_2O_3$, and the like. The most preferred being $Sb_2O_3$.

The alkylene bis-stearamide is the essential component of the self-extinguishing polyblend composition that provides the polyblend with low melt viscosity and high flow for improved processability. Alkylene groups containing 1 to 3 carbon atoms have been found to be compatible with the self-extinguishing polyblends. In particular, these compounds are methylene, ethylene and propylene bis-stearamides with the ethylene bis-stearamide being preferred.

The alkylene bis-stearamide chemically is a condensation product of an alkylene diamine and stearic acid. The ethylene bis-stearamide is commercially available from Glycol Chemicals, Inc., Greenwhich, Conn., under the trademark "Acrawax C" as a dry solid powder with a melting point of 142°–145°C. and a specific gravity of 0.97 at 20°C.

An alkylene bis-stearamide can be incorporated in the polyblend by various methods. The preferred method is by dry blending the powdered solid form with a polystyrene polymer, a graft polychloroprene polymer and an inorganic compound in the proportions desired to a uniform admixture followed by the melt mixing of the dry blend at 425°F. by either extrusion milling or banburying to form a true polymer polyblend.

As the rubber content of polyblends of the present invention increased to provide greater toughness, the melt viscosity increases, causing such polyblend to be more difficult to process. It is thought that the dispersed grafted rubber particles act as filler particles increasing melt viscosity. The problem of reducing the melt viscosity of a tough polyblend without sacrificing other important physical problems needed a solution. High impact strength, modulus tensile strength, and heat distortion under load are essential engineering properties that are usually lowered as the melt viscosity of the polyblend is lowered. If was found that the alkylene bis-stearamide is compatible and disperses uniformly in the polyblend, yet unexpectedly lowers melt viscosity without lowering other important physical properties. The mechanism is not fully understood; however, since the modulus and heat distortion that is determined by the outer rigid phase is not lowered, it appears that the stearamide may preferentially enter the rubber phase or rubber phase interface with the rigid phase improving melt flow and lowering melt viscosity of the polyblend without plasticizing the rigid phase. In addition, the impact strength of the polyblend is also improved unexpectedly indicating that the stearamide is effecting the rubber phase or rubber phase interface to increase the toughening capability of the rubber phase.

Regardless of theory, alkylene bis-stearamide has found to enhance the flow and toughness properties of the composition of the present invention without sacrificing other important physical properties. It was found that the alkylene bis-stearamide is effective over the range of 0.3 to 10.0 per cent by weight based on the total polyblend composition with the most preferred range being 1.0 per cent to 5.0 per cent by weight.

TEST PROCEDURES

Underwriter's Laboratory Subject No. 94 Test

Self-extinguishing (S.E.) properties were measured using the above test which is carried out on test specimen 6 inches × ½ inch × ⅛ inch as follows:

The test specimen is supported from the upper end with longest dimension vertical by a clamp on a ring stand so that the lower end of the specimen is ⅜ inch above the top of the burner tube. The burner is then placed remote from the sample, ignited, and adjusted to produce a blue flame ¾ inch in height.

The test flame is placed centrally under the lower end of the test specimen and allowed to remain for 10 seconds. The test flame is then withdrawn, and the duration of flaming or glowing combustion of the specimen noted. If flaming or glowing combustion of the specimen ceases within 30 seconds after removal of the test flame, the test flame is again placed under the specimen for 10 seconds immediately after flaming or glowing combustion of the specimen stops. The test flame is again withdrawn, and the duration of flaming or glowing combustion of the specimen noted.

If the specimen drips flaming particles or droplets while buring in this test, these drippings shall be allowed to fall onto a horizontal layer of cotton fibers (untreated surgical cotton) placed one foot below the test specimen. Significantly flaming particles are considered to be those capable of igniting the cotton fibers.

The duration of flaming or glowing combustion of vertical specimens after application of the test flame, average of three specimens (6 flame applications) shall not exceed 25 seconds (maximum not more than 30 seconds) and the protion of the specimen outside the clamp shall not be completely burned in the test.

Materials which comply with the above requirements and do not drip any flaming particles or droplets during the burning test will classify as "self-extinguishing, Class I."

Materials which comply with the above requirements, but drip flaming particles or droplets which burn only briefly during the test will classify as "self-extinguishing, Class II."

Class SE-O is given to materials wherein the duration of flaming or glowing combustion averages less than 5 seconds under the conditions above.

FLAMMABILITY OF PLASTICS USING THE OXYGEN INDEX METHOD

ASTM Test D-2863 is used with the General Electric Flammability Index Tester Model A-4990-A. A sample bar ⅛ inch × ½ inch × 5 inches is molded and placed in the above tester. The tester is attached to an oxygen tank and a nitrogen tank. By means of control valves, an atmosphere can be created inside the tester containing any desired ratio of nitrogen to oxygen. The lower the oxygen concentration which will support combustion, the higher the degree of flammability of the test specimen. It is generally considered that the oxygen content should be at least 20 per cent for combustion support in order for a material to be considered sufficiently flame resistant. Of course, the higher the value, the better. A propane torch flame is applied to one end of the test specimen in the tester. If the specimen burns for at least three minutes, the concentration of oxygen is reduced. By a system of trial and error with several specimens, the limiting oxygen concentration is determined where burning will just be supported for at least 3 minutes, but will not be supported at an oxygen concentration 1 per cent lower. This limiting concentration is then reported as the Limiting Oxygen Index (LOI).

WEIGHT AVERAGE PARTICLE SIZE TEST

The weight average particle size is determined by dispersing the polyblend in dimethylformamide using 2 grams of polyblend in 98 grams of solvent. The dispersion is then diluted 3 to 1 with methyl-ethyl-ketone and analyzed according to the published procedure of Groves, M. J., Kaye, B. H., Scarlett, B., "Size Analysis of Subsieve Powders Using a Centrifugal Photosedimentometer, " British Chemical Engineering, Vol. 9:742-744 (1964). A Model 3000 Particle Size analyzer available from Martin Sweets Company, 3131 West Market Street, Louisville, Kentucky was used.

IMPACT STRENGTH TEST

ASTM Test D-256 - Method A commonly known as the Izod Test. Impact values are a measure of toughness and high values are needed for engineering applications preferably greater than 1.5 ft./lbs./in.

HEAT DISTORTION TEMPERATURE UNDER LOAD

ASTM Test D-648 was used with a load of 264 psi. Test values here should remain high so that the polyblend is functional at high temperatures in engineering applications, e.g. automotive and appliances.

GRAFT LEVEL TEST

Weigh out 1 gram of grafted resin and disperse in 20 ml of a solvent of 50/50 dimethylformamide/methyl ethyl ketone. The matrix polymer will dissolve. Centrifuge and decant off the solvent. Repeat the process three times and dry the grafted rubber under vacuum and weigh.

$$\% \text{ Graft} = \frac{\text{wgt. of grafted rubber} - \text{wgt. of rubber} \times 100}{\text{wgt. of rubber}}$$

MELT VISCOSITY TEST

A Sieglaff-McKelvey Rheometer Model R-64 available from the Tinius Olsen Testing Machine Company, Willow Grove, Pennsylvania, was used to determine the melt viscosity of the polyblends according to the Instruction Manual for Model R-64. A shear rate of 100 sec.$^{-1}$ was used to determine an apparent viscosity in poises. The shear stress versus shear rate relationship is determined with apparent viscosity being defined as a = shear stress/rate of shear.

SAMPLE PREPARATION

The plastic to be tested is usually in comminuted form. A portion of the plastic particles are compression molded at 330°–360°F. at 7,200 psi to form a sheet about ⅛ inch thick. Sample bars are then cut from the molded sheet having dimensions of ⅛ inch × ½ inch × 6 inches. Samples of polyblend polymers are prepared using ungrafted and grafted chloroprene rubber to demonstrate the properties of the two types and their ability to provide self-extinguishing properties and impact strength to the styrene family of polymers. Other pertinent physical properties are measured such as the heat distortion under load, gloss and melt viscosity.

The following examples are presented in illustration of the present invention and are not intended in any way to limit the scope or spirit thereof.

EXAMPLE 1

CONTROL

A typical polyblend of styrene-acrylonitrile copolymer (SAN) containing about 25 per cent AN and a grafted polybutadiene rubber grafted with a 75/25 S/AN ratio of monomer is used. The polyblend containing about 23 per cent rubber and about 77 per cent SAN by weight, is available from the Monsanto Company of St. Louis, Mo. as Lustran ABS 740. The impact strength is 3.0 ft./lbs./in. at 73°F.; the percentage of oxygen that just supports combustion is 18 per cent (LOI) and will not pass the UL 94 test. Those skilled in the art would recognize that this polyblend has a desirably high impact strength but that it is too low in flame retardancy for such uses. The grafted rubber then has the necessary compatibility to reinforce the polyblend to give high toughness.

EXAMPLE 2

CONTROL

A polyblend with SAN copolymer (Monsanto Company LNA 21) is prepared using 65 parts SAN polymer, 30 parts of solid chloroprene rubber (du Pont Neoprene W) and 5 parts of $Sb_2O_3$. The polyblend is colloided on a Bolling roll mill using 130 psi steam pressure to reach a melt temperature of 400°–450°F. for 5 minutes after which the polyblend is stripped from the mill, cooled and communited. Test samples were prepared. The UL 94 test gives values of SE-O showing the polyblend is self-extinguishing. The impact strength test gives an Izod of less than 0.5 ft./lbs./in. demonstrating that ungrafted chloroprene that is both a noncrosslinked and ungrafted rubber lacks the necessary compatibility with the rigid phase SAN copolymer to produce a tough polyblend.

EXAMPLE 3

CONTROL

A polyblend is prepared by first blending an emulsion of a SAN copolymer with an emulsion of chloroprene rubber (du Pont Latex 842-A sold by E. I. du Pont Company of Wilmington, Delaware) and coagulating with aluminum sulfate to form a crumb having 40 per cent rubber and 60 per cent SAN. The emulsion SAN copolymer is prepared using the following formulation based on parts per 100 parts of total monomers:

| | |
|---|---|
| Styrene | 70 |
| Acrylonitrile | 30 |
| Water | 116 |
| Potassium Persulfate | 0.005 |

-Continued

| | |
|---|---|
| Terpinolene | 0.003 |
| Rubber Reserve Soap | 0.018 |
| (Emery Industries of Cincinnati, Ohio. Sodium salt of oleic, stearic and palmitic acids) | |
| Darvan No. 1 | 0.005 |
| (Sodium salt of a formaldehyde naphthalene sulfonate sold by Dewey and Almy of Cambridge, Mass.) | |

The monomers are dispersed in water containing the soap and Darvan and polymerized at 95°C. under reflux for 3 hours and 45 minutes in the presence of the potassium persulfate and catalyst and the terpinolene modifier under agitation. The emulsion contains 46.3 per cent of SAN polymer in the emulsion.

The average particle size of the rubber particles in the chloroprene rubber latex and the polyblend is observed to be about 0.12 microns (weight average based on centrifugal photosedimentation method).

The crumb is mechanically blended with a SAN copolymer (Monsanto LNA 21 sold by Monsanto Company of St. Louis, Missouri) and tested as in Example 2 with the blend having 30 parts chloroprene rubber, 65 parts SAN polymer and 5 parts $Sb_2O_3$. The Izod test values are 1.5 ft./lbs./in. The UL-94 test have SE-O values. The percentage of oxygen to support combustion is 25.1 per cent (LOI) and the heat distortion under load at 264 psi is 195°C. It is evident that the polyblend is self-extinguishing; has flame retardancy; has a high heat distortion temperature and has a higher degree of toughness because the rubber is crosslinked. The emulsion blending does provide a better polyblend than that of Example 2 having an impact strength of 1.5 ft./lbs./in. versus 0.5 ft./lbs./in. for a blend of solid rubber and copolymer wherein the rubber is not crosslinked.

EXAMPLE 4

Graft chloroprene rubber is prepared by the following procedure:

| A reaction mixture of by parts: | |
|---|---|
| Chloroprene Rubber | 100 |
| (du Pont Latex 842 A 50% solids) | |
| Styrene Monomer | 28 |
| Acrylonitrile Monomer | 12 |
| Emulsifying Agent | 1 |
| (Dowfax 2A1) (Dowfax 2A1, a sodium salt of an alkyl diphenyl oxide sulfonate sold by Dow Chemical of Midland, Michigan) | |
| Potassium persulfate initiator | 1 |
| Terpinolene Modifier | 0.5 |
| Water | 260 |

The chloroprene latex, water, Dowfax and terpinolene are added to a stirred reactor and brought to 85°C. The monomers and initiator are added to the reaction over a period of 2 hours with a final finishing period of 1½ hours to give a latex having a solids level of 35 per cent. The average particle size of the rubber particles in the latex is observed to be about 0.12 microns (weight average based on centrifugal photosedimentation method). A grafted chloroprene rubber is formed along with SAN copolymer. The resulting latex is further blended with the SAN latex of Example 3 and coagulated using aluminum sulfate to recover the solid polyblend. Analysis of the polyblend shows the blend to be 30 percent polychloroprene having 14.4 styrene. weight percent of SAN grafted based on rubber; 65 percent SAN polymer including the grafted SAN. The blend is further melt colloided on a mill as in Example 2 with 5 percent Sb$_2$O$_3$ and the comminuted polyblend tested. The Izod impact strength is 4.4 ft./lbs./in.; the heat distortion temperature under load is 191°F.; the UL-94 test values are SE-O and the percentage oxygen to support combustion is 25.6 percent (LOI). It is evident that the grafted chloroprene provides the polyblend with high impact strength or toughness; self-extinguishing properties and high flame retardancy without sacrificing the heat distortion temperature for functional engineering uses.

EXAMPLE 5

Example 4 is repeated running to a total lower conversion of 75 percent wherein the SAN graft level on the chloroprene rubber is 11.4 percent by weight based on rubber. The final polyblend admixture contains 30 percent chloroprene, 65 percent SAN polymer and 5 percent Sb$_2$O$_3$ as in Example 4. The admixture is melt colloided as in Example 2 and the comminuted polyblend tested. The Izod Impact strength is 2.3 ft./lbs./in. showing a lower level of toughness when the graft level is lower and provides lower interaction with the rigid SAN phase but higher than the ungrafted chloroprene rubbers of Examples 1 and 2. The UL-94 test gives values of SE-O showing the polyblend to be highly self-extinguishing. The percentage oxygen to support combustion is 25.3 percent (LOI) showing high flame retardancy and the heat distortion temperature under load is 197°F. showing the polyblend is self-extinguishing and tough without sacrificing the heat distortion temperature under load is 197°F. showing the polyblend is self-extinguishing and tough without sacrificing the heat distortion temperature for functional engineering uses.

EXAMPLE 6

A higher grafted chloroprene is prepared by using the following formulation based on parts per 100 parts of total monomers:

| | |
|---|---|
| Styrene | 70 |
| Acrylonitrile | 30 |
| Chloroprene Rubber | 100 |
| (du Pont Latex 842 A 50% solids) | |
| Terpinolene | 1 |
| Darvan No. 1 | 1 |
| Potassium Persulfate | 1 |
| Rubber Reserve Soap | 1 |
| Water | 370 |

The Darvan No. 1 is added to the water and the chloroprene rubber latex then dispersed followed by the monomers and the catalyst. The monomers and catalyst are added at 25 parts per hour on 70/30 ratio basis with proportionate amounts of catalyst over a 4 hour period. The Rubber Reserve Soap is added after one half of the monomers have been added. The polymerization is carried out at 85°C. under agitation to give a latex with about 35 percent final solids. A grafted chloroprene rubber is formed along with SAN copolymer. The resulting latex is further blended with the SAN latex of Example 3 and coagulated using aluminum sulfate to recover the solid polyblend. The average particle size of the rubber particles in the polyblend are observed to be about 0.12 microns (weight average). The SAN graft on the chloroprene rubber is 48.0 percent by weight based on rubber. The final polyblend admixture contains 30 percent chloroprene, 65 percent SAN polymer and 5 percent Sb$_2$O$_3$ as in Example 4. The admixture is melt colloided as in Example 2 and the comminuted polyblend tested. The Izod impact is 0.8 ft./lbs./in. showing low impact values and toughness; the UL-94 test shows values of SE-O as self-extinguishing; and the heat distortion under load is 170°F. showing loss of heat distortion. It is evident that too high a level of grafting on the small chloroprene rubber particles lowers toughness.

EXAMPLES 7, 8, 9, and 10

Latex blends of lower graft and higher graft polychloroprene rubber are made using the grafted rubbers of Examples 4 and 6 as low and high respectively to give blends that have 30 percent chloroprene rubber by weight. These blends are in turn blended with SAN latex as in Example 3. The final admixtures were made to have the following compositions as tabulated below along with the physical tests of each composition. The Peak Hunter Gloss values are determined by measuring the gloss of a molded sample on a Hunter Laboratory Model D-36 Glassmeter supplied by Hunter Associates of McLean, Virginia.

| | EXAMPLES | | | |
|---|---|---|---|---|
| | Ex. 7 | Ex. 8 | Ex. 9 | Ex. 10 |
| Low Graft Rubber | 30 | 15 | 9 | 0 |
| High Graft Rubber | 0 | 15 | 21 | 30 |
| SAN Polymer | 65 | 65 | 65 | 65 |
| Antimony Oxide | 5 | 5 | 5 | 5 |
| Izod Impact Strength | 4.4 | 3.1 | 2.7 | 0.8 |
| HDTUL (264 psi) | 191 | 182°F | 182°F. | 176 |
| UL-94 | SE-O | SE-O | SE-O | SE-O |
| Peak Hunter Gloss | 0 | 4 | 23 | 64 |

It is evident from the test values that low graft chloroprene rubbers can upgrade the high graft chloroprene rubbers to a high level of toughness bringing them from about 0.8 ft./lbs./in. to levels of toughness over 1.5 ft./lbs./in. generally accepted for impact polyblends. It is also evident that the gloss level for the high graft rubber types is higher than for the low graft rubbers.

EXAMPLES 11 through 15

Rubber Particle Size Parameters

The chloroprene latex is observed to have an average rubber particle size of about 0.12 microns (weight average). The latex is agglomerated to give larger particles for testing as in Examples 4–10. Agglomeration is carried out according to the following procedures using:

| | |
|---|---|
| Chloroprene Rubber | 100 parts |
| (du Pont Latex 842A 25% solids) | |
| Emulsifying Agent | .045 parts |
| (Dowfax 241) | |
| Acetic Anhydride | 6 parts |
| Water | 300 parts |

Dissolve 6 parts of the acetic anhydride in 60 ml of water and add to the rubber latex containing the Dowfax. Stir for 30 seconds after addition and let stand 30 minutes. Add 2 parts of Dowfax to the emulsion to stabilize the emulsion. The average particle size of the rubber particle is observed to be about 0.50 microns (weight average).

The above emulsion is then grafted according to the procedure of Example 6 using varying amounts of terpinolene and catalyst to vary the conversion and percent graft. The grafted rubber emulsion is then processed into a polyblend and tested as in Example 6.

chloroprene rubber having a particle size in the range of about 0.50 microns with 80 percent to 90 percent of a high graft chloroprene rubber having rubber particles in the range of about 0.12 microns. Also, the gloss of such blends has high values along with other good heat distortion temperatures and excellent selfextinguishing properties.

|  | EXAMPLES | | | | |
|---|---|---|---|---|---|
|  | 11 | 12 | 13 | 14 | 15 |
| Catalyst | 1.0 | 1.0 | 1.5 | 1.0 | 1.0 |
| Terpinolene (parts) | 1.0 | 0.5 | 0.0 | 0.0 | 0.5 |
| Graft Level (wgt. %) | 2.5 | 8.9 | 15.0 | 21.9 | 27.3 |
| % Conversion | 64 | 77 | 85 | 99 | 82.0 |
| Wgt. % Rubber | 30 | 30 | 30 | 30 | 30 |
| Wgt. % SAN | 70 | 70 | 70 | 70 | 70 |
| Wgt. % $Sb_2O_3$ | 5 | 5 | 5 | 5 | 5 |
| Izod Impact | 2.3 | 2.3 | 2.3 | 2.9 | 1.5 |
| Hunter Gloss | 23 | 41 | 49 | 50 | — |
| HDTUL. °F. | 183 | 180 | 185 | 185 | 177 |
| UL-94 | SE-O | SE-O | SE-O | SE-O | SE-O |

The data show that the percent graft can be varied from about 2.5 to about 30 percent with an average chloroprene rubber particle size of about 0.5 microns (wgt. average) before impact strength begins to drop with the gloss improving as the weight percent graft increases. It is also evident that these low graft rubbers having an average particle size of about 0.50 microns have reasonably high gloss compared to low graft chloroprene rubbers of Examples 4–5, having an average rubber particle size of about 0.12 microns. This would indicate that the smaller rubber particle size rubbers provide much greater surface area for grafting, hence, are effectively less grafted and can agglomerate to give larger particles to improve impact strength but then lower gloss. Regardless of the theory the percent graft should be adjusted relative to particle size to provide both good impact strength and gloss within the parameters shown. In addition, it is observed that the heat distortion is high and polyblends have excellent selfextinguishing properties.

EXAMPLES 16–17

Examples 7–10 are repeated using a blend of high graft rubber of Example 6 having an average rubber particle size of about 0.12 microns and a graft level of 48.0 weight percent and the low graft rubber of Example 13 having an average rubber particle size of about 0.5 microns and a graft level of about 15.0 weight percent. The test results are:

|  | Ex. 16 | Ex. 17 |
|---|---|---|
| Wgt. % Low Graft Rubber | 3 | 6 |
| Wgt. % High Graft Rubber | 27 | 24 |
| Wgt. % SAN Polymer | 70 | 70 |
| Wgt. % $Sb_2O_3$ | 5 | 5 |
| Izod Impact Strength | 2.1 | 2.4 |
| Hunter Gloss | 45 | 60 |
| HDTUL | 176 | 178 |
| UL-94 | SE-O | SE-O |

The test data show high impact polyblends can be produced using 10 to 20 percent by weight of low graft

EXAMPLE 18

PART A

Fourteen parts of a soluble butadiene rubber were dissolved in 26.0 parts of acrylonitrile and 60.0 parts styrene. There were added thereto 0.07 part of a mixture of tertbutyl peracetate, 0.05 part ditert-butyl peroxide and stabilizers. The mixture was heated to 100°C. with stirring. Terpinolene was added as a chain transfer agent over a period of approximately 5 hours in an amount of about 0.1 part per hour for approximately 5 hours, at the end of which time an additional 10.4 parts were added.

At 30.0 percent conversion of the monomers, the partially polymerized syrup was dispersed in 120.0 parts water to which was added 2.0 parts styrene and, as a suspending agent, 0.3 part of an interpolymer of 95.5 mol percent of acrylic acid and 4.5 mol percent of 2-ethylhexylacrylate which has a specific viscosity of about 4.0 as determined in a 1.0 percent solution in water at 25°C. The resulting suspension was stirred and heated to polymerize the remaining monomer, cooled, centrifuged, washed and dried to recover the graft copolymer in the form of small spherical beads. The ratio of superstrate to substrate was about 0.9 to 1.0:1.0, and the particle size was about 0.9 micron.

PART B

Seventy grams of beads from Part A are milled and melt colloided as in Example 2 with the 930 grams of the final polyblend admixture of Example 6. The final polyblend now contains about 1 percent of polybutadiene rubber. The milled polyblend is comminuted and tested.

PART C

Using the above procedure, 210 grams of Part A were colloided with 790 grams of the final polyblend of Example 6. The final polyblend now contains about 3 percent polybutadiene rubber. The milled polyblend is comminuted and tested. The test data on the two polyblends B and C are shown below:

| Polyblend | UL-94 Test | Impact Test | HDLT Test | Gloss Test |
|---|---|---|---|---|
| Part B | SE-O | 2.5 ft./lbs. | 187°F. | 70 |
| Part C | SE-O | 7.0 ft./lbs. | 177°F. | 50 |

The soluble rubbers used in Example 18 are diene rubbers such as high-cis polybutadiene rubbers having a cis-isomer content of about 30 percent to 98 percent and having a second order transition temperature, Tg, of from about −50°C. to −105°C. as determined by ASTM Test D-746-52T. These rubbers are available, for example, as Diene 35 and 55 from the Firestone Rubber Company of Akron, Ohio and as Polysar Taktene 1202 from the Polymer Corporation of Sarnia, Ontario. Other soluble diene rubbers include copolymers of conjugated 1,3-butadiene with up to equal amounts by weight of one or more copolymerizable monoethylenically unsaturated monomers such as monovinylidene aromatic monomers, e.g., styrene, and monoethylenically unsaturated nitriles, e.g. acrylonitrile. The preferred diene copolymer rubbers are those having a second order transition temperature, Tg, range of from about −20°C. to −70°C.

The polychloroprene rubbers contained in an emulsion and used in preparing the polyblends of the present invention are readily available in the form of latices. These latices are commercially available as Neoprene Latices from the E. I. du Pont de Nemours and Company, Wilmington, Delaware and are described in the reference "Neoprene Latex" by J. C. Carl, published by du Pont in 1962. These latices have a rubber solids content of about 34.5 percent to 60 percent, a pH of about 9 to 13, latex specific gravity of about 1.10 to 1.15, rubber specific gravity of 1.23 to 1.42, latex viscosity of 16 to 400 cps. (Brookfield viscosity) and the latices are stabilized by anionic or cationic emulsifiers. The rubbers contained in the latices are crosslinked and are a medium to high gel type, are viscous, having a Mooney viscosity of at least about 200 (MS-2½ min. 212°F.). The rubber particle size distribution of such latices can be varied so as to give the selected weight average particle size range desired and disclosed in this invention.

Such neoprene latices are also commercially available from the Petro-Tex Chemical Corporation of Houston, Texas.

EXAMPLE 19

SAN SUSPENSION POLYMERS

The rigid phase SAN polymers may be produced by emulsion polymerization as in Example 3 or suspension polymerization for blending with the rubber crumb. The suspension SAN polymers are prepared as follows:

| Formulation | Parts by weight |
|---|---|
| Styrene | 46.5 |
| Acrylonitrile | 53.5 |
| Water | 100.0 |
| Versenol 120¹ | 4.0 ppm H₂O |
| Terpinolene | 0.20 |
| t-butyl peroxide | 0.05 |
| Na₂SO₄ | 0.25 |

¹Sequestering agent, supplied by Dow Chemical Company, Midland, Michigan under trademark "Versenol 120"

Charge above initial charge into nitrogen purged stirred reactor; close and heat to 90°C. over a period of 30 minutes. Heat from 90°C. to 128°C. over a period of 60 minutes while adding 15.1 parts of 90°C. to 0b 128°C. Add suspending agent PDR-14 (acrylic acid-acrylate interpolymer of U.S. Pat. No. 2,945,013 granted 7/12/60 and U.S. Pat. No. 3,051,682 granted 8/28/62) and heat from 125°C. to 145°C. over a period of 60 minutes and hold at 145°C. for 60 minutes. Steam strip monomers for 2 hours and cool. Filter off suspended beads and dry. The molecular weight of the SAN polymer is about 45,000.

EXAMPLE 20

The procedure of Example 6 is used to prepare a grafted polychloroprene rubber latex. The latex was coagulated using aluminum sulfate and dried to a free-flowing interpolymer crumb analyzing 52 percent chloroprene rubber; the rubber having about 48 percent grafted SAN representing 25 percent by weight of the crumb. SAN polymer representing 23 percent by weight of the crumb is contained and dispersed uniformly in the interpolymer crumb. Several polyblends are prepared by dry blending the rubber crumb with the SAN polymer of Example 19, a grafted polybutadiene rubber interpolymer of Example 18, antimony oxide and varying proportions of ethylene bis-stearamide.

| Formulation | Parts by Weight |
|---|---|
| Polychloroprene graft crumb¹ | 38.5 |
| SAN Suspension Polymer | 33.8 |
| Grafted polybutadiene interpolymer² | 17.8 |
| Antimony Oxide (Sb₂O₃) | 9.0 |

¹Polychloroprene graft crumb containing 52% chloroprene rubber or 20 parts in formulation
²Grafted polybutadiene interpolymer containing 14% rubber or 2.5 parts polybutadiene rubber in formulation The above self-extinguishing formulation is blended with the following proportions of ethylene-bis-stearamides and tested for melt viscosity, impact strength and heat distortion under load (HDTUL).

|  | A | B | C | D |
|---|---|---|---|---|
| Ethylene bis stearamide (parts) | 0.0 | 1.0 | 2.0 | 3.0 |
| Impact strength (ft lbs in) | 1.0 | 2.7 | 3.2 | 3.2 |
| HDTUL °F | 185 | 185 | 183 | 182 |
| Melt viscosity ×10⁴ poise | 1.19 | 1.12 | 1.03 | 0.99 |
| UL 94 Test | SE-O | SE-O | SE-O | SE-O |
| Hunter Gloss | 66 |  |  | 70 |

The above test data shows the unexpected effects of ethylene bis-stearamide demonstrating the ability of the material to decrease melt viscosity and increase flow without substantially lowering heat distortion or impact strength. In fact, impact strength is synergistically and dramatically improved.

RIGID PHASE MONOMERS

Other copolymerizable monomers may be interpolymerized with the monovinylidene aromatic monomers and/or the ethylenically unsaturated nitriles of the rigid phase already described. The described monomers can also be replaced by such other copolymerizable monomers consistent with desired physical properties such as modulus, heat distortion, melt viscosity, impact strength and elongation. As known in the art, the amount of such other copolymerizable monomers which may be used in the rigid phase will be determined by the physical properties needed and already described. Exemplary of the monomers which may be interpolymerized with the monovinylidene aromatic hydrocarbons and unsaturated nitriles are conjugated 1,3-dienes, e.g. butadiene, isoprene, etc.; alpha- or beta-unsaturated monobasic acids or derivatives thereof, e.g. acrylic acid methyl acrylate, ethyl acrylate, butyl acrylate, 2-ethylhexyl acrylate, methacrylic acid and the corresponding esters thereof; acrylamide, methacrylamide; vinylidene chloride, vinylidene bromide, etc.; vinyl esters such as vinyl acetate, vinyl propionate, etc. dialkyl maleates or fumarates such as dimethyl maleate, diethyl maleate, dibutyl maleate, the corresponding fumarates, etc.

What is claimed is:

1. A low melt viscosity self-extinguishing high impact strength polymeric polyblend composition comprising:
   A. a polymer of a monovinylidene aromatic monomer and an ethylenically unsaturated nitrile monomer wherein the weight ratio of monovinylidene aromatic monomer to nitrile monomer is in the range of 95/1 to 1/95,
   B. from 15 to 40 percent by weight, based on the total weight of the polyblend, of a crosslinked polychloroprene rubber having a Mooney viscosity of at least 200 (MS 2½ min., 212°F.), which is grafted with:
      1. at least one monovinylidene aromatic monomer; and
      2. an ethylenically unsaturated nitrile monomer;
   wherein the weight ratio of monovinylidene aromatic monomer to nitrile monomer in the grafted rubber is in the range of 95/1 to 1/95;
   wherein the percent graft of aromatic monomer and nitrile monomer onto the polychloroprene rubber is in the range from 10 to 100 percent by weight, based on the weight of the polychloroprene rubber;
   C. from 1 to 15 percent by weight, based on the total weight of the polyblend of an inorganic compound selected from the group consisting of $Sb_2O_3$, $Bi_2O_3$, $MoO_3$, $SnO_2$, $WO_3$, and mixtures of the same; and
   D. from 0.3 to 10.0 percent by weight, based on the total weight of the polyblend of an alkylene bis stearamide wherein the alkylene group contains from 1 to 3 carbon atoms;
   wherein the total amount of polymer formed from the vinylidene aromatic monomer and the unsaturated nitrile monomer in the polyblend composition is in the range of from 45 to 84 percent by weight, based on the total weight of the polyblend 2. The polyblend of claim 1 wherein said monovinylidene aromatic monomer is selected from the group consisting of styrene, aralkylstyrenes, alphalkylstyrenes, alphahalostyrenes, and arhalostyrenes and mixtures of the same 3. The polyblend of claim 1 wherein the monovinylidene aromatic monomer is styrene 4. The polyblend of claim 1 wherein at least one of the monovinylidene aromatic monomers is monochlorostyrene.

5. The polyblend of claim 1 wherein said ethylenically unsaturated nitrile is selected from the group consisting of acrylonitrile, methacrylonitrile, ethacrylonitrile and mixtures of the same.

6. The polyblend of claim 1 wherein said ethylenically unsaturated nitrile is acrylonitrile.

7. The polyblend of claim 1 wherein the ethylenically unsaturated nitrile is methacrylonitrile.

8. The polyblend of claim 1 having a first grafted chloroprene rubber wherein the average graft rubber particle size, based or weight average, is from about 0.05 to 0.20 microns, a second grafted chloroprene rubber wherein the average rubber particle size, based on weight average, is from about 0.40 to 1.5 microns wherein said first grafted rubber is present in from about 50.0 to 97.0 percent of the total weight of the first and second grafted rubbers.

9. The composition of claim 1 having a grafted chloroprene rubber wherein the weight average rubber particle size is about 0.3 to 1.5 microns, being grafted with from about 10 percent to 100 percent by weight of said monomers based on the weight of the chloroprene rubber.

10. The polyblend of claim 1 wherein said inorganic compound is $Sb_2O_3$.

11. A polyblend of claim 1 wherein the alkylene bis-stearamide is ethylene bis-stearamide.

12. A polyblend of claim 1 wherein the ethylene bis-stearamide is present in from about 1.0 percent to 5.0 percent by weight of the polyblend.

13. The polyblend of claim 1 wherein about 0.5% to 5% by weight of the total polyblend is a diene rubber said diene rubber being grafted with:
   1. at least one monovinylidene aromatic monomer, and
   2. an ethylenically unsaturated nitrile monomer wherein said ethylenically unsaturated nitrile monomer moiety constitutes from 0 to about 90 percent by weight of the total monomers grafted,
   wherein said grafted diene rubber having a weight average rubber particle size of from about 0.7 to 1.5 microns is grafted with from about 50 percent to 150 percent by weight of said monomer and wherein said grafted chloroprene rubber has a weight average rubber particle size of from about 0.05 to 0.20 microns being present in said polyblend in from about 16.5 percent to 80 percent by weight of the polyblend providing from about 15 percent to 40 percent by weight of chloroprene rubber in the polyblend.

14. The polyblend of claim 13 wherein said monovinylidene aromatic monomer is styrene.

15. The polyblend of claim 13 wherein said ethylenically unsaturated nitrile monomer is acrylonitrile.

16. A polyblend of claim 13 wherein said diene rubber is selected from the group consisting of polybutadiene, butadiene-styrene copolymer or butadiene-acrylonitrile copolymer wherein said polybutadiene rubber has a cis isomer content of about 30 percent to 98 percent and a Tg range of from about −50 °C. to −105°C. said butadiene copolymer rubbers having a Tg range of from about −20°C. to −70°C.

17. A low melt viscosity self extinguishing high impact strength polymeric polyblend composition comprising:

A. a polymer of styrene and acrylonitrile wherein the acrylonitrile monomer constitutes about 25% by weight of the said polymer uniformly blended with:
B. from 16.5 to 80 percent by weight based on the total weight of the polyblend, of at least one crosslinked grafted chloroprene rubber, which has been crosslinked to a Mooney value of at least 200 (MS - 2½ min. 212°F.), said rubber grafted with:
1. styrene, and
2. acrylonitrile, wherein the acrylonitrile monomer constitutes about 25 percent by weight of the total monomers grafted, wherein the amount of chloroprene rubber in the polyblend is in the range of from 15 to 40 percent by weight based on the total weight of the polyblend,
C. from 1 to 15 percent by weight, based on the total weight of the polyblend of antimony oxide, and
D. from 0.3 to 10.0 percent by weight, based on the total weight of the polyblend of an alkylene bis-stearamide wherein the alkylene group contains from 1 to 3 carbon atoms.

* * * * *

UNITED STATES PATENT OFFICE
CERTIFICATE OF CORRECTION

PATENT NO. : 3,903,037

DATED : September 2, 1975

INVENTOR(S) : Gary L. Deets

It is certified that error appears in the above-identified patent and that said Letters Patent are hereby corrected as shown below:

Column 3, line 3, "other" should read --- outer ---.

Column 3, line 5, "releiving" should read --- relieving ---.

Column 6, line 55, "If" should read --- It ---.

Column 7, line 45, "protion" should read --- portion ---.

Column 16, line 4, delete "90°C. to 0b 128°C." and insert therefor --- styrene ---.

In Claim 16, lines 6 to 8, please insert a minus sign (-) before the temperatures 50°C., 105°C., 20°C. and 80°C. so that lines 6 to 8 read as follows --- 98 percent and a Tg range of from about -50°C. to -105°C. said butadiene copolymer rubbers having a Tg range of from about -20°C. to -80°C. ---.

Signed and Sealed this twentieth Day of January 1976

[SEAL]

Attest:

RUTH C. MASON
Attesting Officer

C. MARSHALL DANN
Commissioner of Patents and Trademarks